US010152562B1

(12) United States Patent
    Tanielian

(10) Patent No.: US 10,152,562 B1
(45) Date of Patent: Dec. 11, 2018

(54) SUBMERGED SURVEILLANCE NODE

(71) Applicant: THE BOEING COMPANY, Chicago, IL (US)

(72) Inventor: Minas Tanielian, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 1240 days.

(21) Appl. No.: 13/949,591

(22) Filed: Jul. 24, 2013

(51) Int. Cl.
    G06F 17/40 (2006.01)
(52) U.S. Cl.
    CPC ..................... G06F 17/40 (2013.01)
(58) Field of Classification Search
    CPC .......... B63G 8/001; B63G 8/42; G08B 23/00; F41F 3/07; F42B 15/20; H04M 3/2281
    See application file for complete search history.

(56) References Cited

U.S. PATENT DOCUMENTS 8,654,189 B1* 2/2014 Spangler ............... H04N 7/183
                                                    348/81
2004/0065247 A1* 4/2004 Horton .................. B63G 8/001
                                                    114/322
2008/0251111 A1* 10/2008 Yoo ........................ H01L 35/30
                                                    136/201
2009/0245025 A1* 10/2009 Rhodes .................. H04B 13/02
                                                    367/134
2009/0308236 A1* 12/2009 Matveev .................. F41F 3/07
                                                    89/1.809
2013/0187787 A1* 7/2013 Damus .................. H04B 13/02
                                                    340/850

* cited by examiner

Primary Examiner — Kyle R Quigley
(74) Attorney, Agent, or Firm — Duft & Bornsen, PC

(57) ABSTRACT

Exemplary embodiments provide autonomous surveillance systems for underwater environments. In one embodiment, a submerged node rests on a floor of a body of water, a module floats on the surface of the water, and a cable connects the submerged node to the floating module. The floating module collects sensor data and generates electricity, and provides both to the submerged node over the cable for storage by the submerged node. The submerged node receives a query for the sensor data from an antenna on the floating module. The submerged node identifies the sensor data based on the query, and transmits a response to the query for the sensor data using the antenna on the array.

19 Claims, 3 Drawing Sheets

SUBMERGED SURVEILLANCE NODE

FIELD

This disclosure relates to the field of monitoring systems and in particular, to underwater monitoring systems.

BACKGROUND

Underwater security addresses the protection of valuable assets that may be vulnerable to attack from the water. Security threats can arise in a number of different forms, including underwater vehicles, surface ships, divers, etc. The need for surveillance can change over time, which makes the implementation of fixed monitoring systems less practical. For instance, global hotspots may arise which could benefit from the rapid deployment of autonomous systems in deep ocean environments for monitoring ocean activity of hostile forces.

Currently, monitoring is performed by buried underwater sensors, small un-manned vehicles, or buoys that are not always ideal for rapidly changing threats. One example of a buried underwater sensor is the Sound Surveillance System (SOSUS). SOSUS is a chain of underwater listening posts that was originally intended to track Soviet submarines by the United States during the cold war. However, SOSUS requires ocean floor hydrophone stations that are connected to offshore facilities by underwater cables, which limits its expandability. Un-manned underwater vehicles often have limited power storage capabilities and therefore, may only be operational for a short amount of time. Buoys may also be deployed for monitoring, but they tend to be easily identifiable on the ocean surface and targeted for removal.

In view of the above discussion, problems remain for implementing submerged surveillance systems that can be rapidly deployed for long missions, yet remain resistant to detection.

SUMMARY

Exemplary embodiments described herein provide a surveillance system that utilizes a submerged section on the bottom of a body of water coupled with a floating section on the surface of the water. The two sections are coupled via a cable, which can be used to route data and power. The floating section collects energy and sensor data from the environment and provides the energy and the sensor data to the submerged section by way of the cable. The floating section also includes an antenna, which allows the submerged section to respond to external queries for information, such as queries for the collected sensor data. The floating section may be stealthily configured to look like floating debris, which allows the system to evade detection and remain on station for long periods of time.

One exemplary embodiment comprises a submerged node, a floating module, and a cable coupling the submerged node and the floating module together. The submerged node is adapted to rest on a floor of a body of water, and includes a power storage system and a data storage system. The floating module is adapted to float on a surface of the body of water, and includes an antenna, a sensor system, and a power harvesting system. The floating module is further adapted to collect sensor data utilizing the sensor system, and to provide the sensor data to the submerged node utilizing the cable for storage by the data storage system. The floating module is further adapted to generate power utilizing the power harvesting system, and to provide the power to the submerged node utilizing the cable for storage by the power storage system. The submerged node is further adapted to receive a query for the sensor data via the antenna on the floating module, to identify the sensor data in the data storage system based on the query, and to transmit a response to the query for the sensor data utilizing the antenna on the floating module.

Another exemplary embodiment comprises a method of operating a surveillance system. The method comprises deploying a surveillance system that includes a submerged node and a floating module coupled by a cable, where the submerged node includes a power storage system and a data storage system, and wherein the floating module includes an antenna, a sensor system, and a power harvesting system. The method further comprises collecting sensor data utilizing the sensor system, and providing the sensor data to the submerged node utilizing the cable for storage by the data storage system. The method further comprises generating power utilizing the power harvesting system, and providing the power to the submerged node utilizing the cable for storage by the power storage system. The method further comprises receiving a query for the sensor data via the antenna on the floating module, and identifying the sensor data in the data storage system based on the query. The method further comprises transmitting a response to the query for the sensor data utilizing the antenna on the floating module.

The features, functions, and advantages that have been discussed can be achieved independently in various exemplary embodiments or may be combined in yet other exemplary embodiments further details of which can be seen with reference to the following description and drawings.

DESCRIPTION OF THE DRAWINGS

Some exemplary embodiments are now described, by way of example only, and with reference to the accompanying drawings. The same reference number represents the same element or the same type of element on all drawings

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific exemplary embodiments or examples described below, but by the claims and their equivalents.

Figure 1:
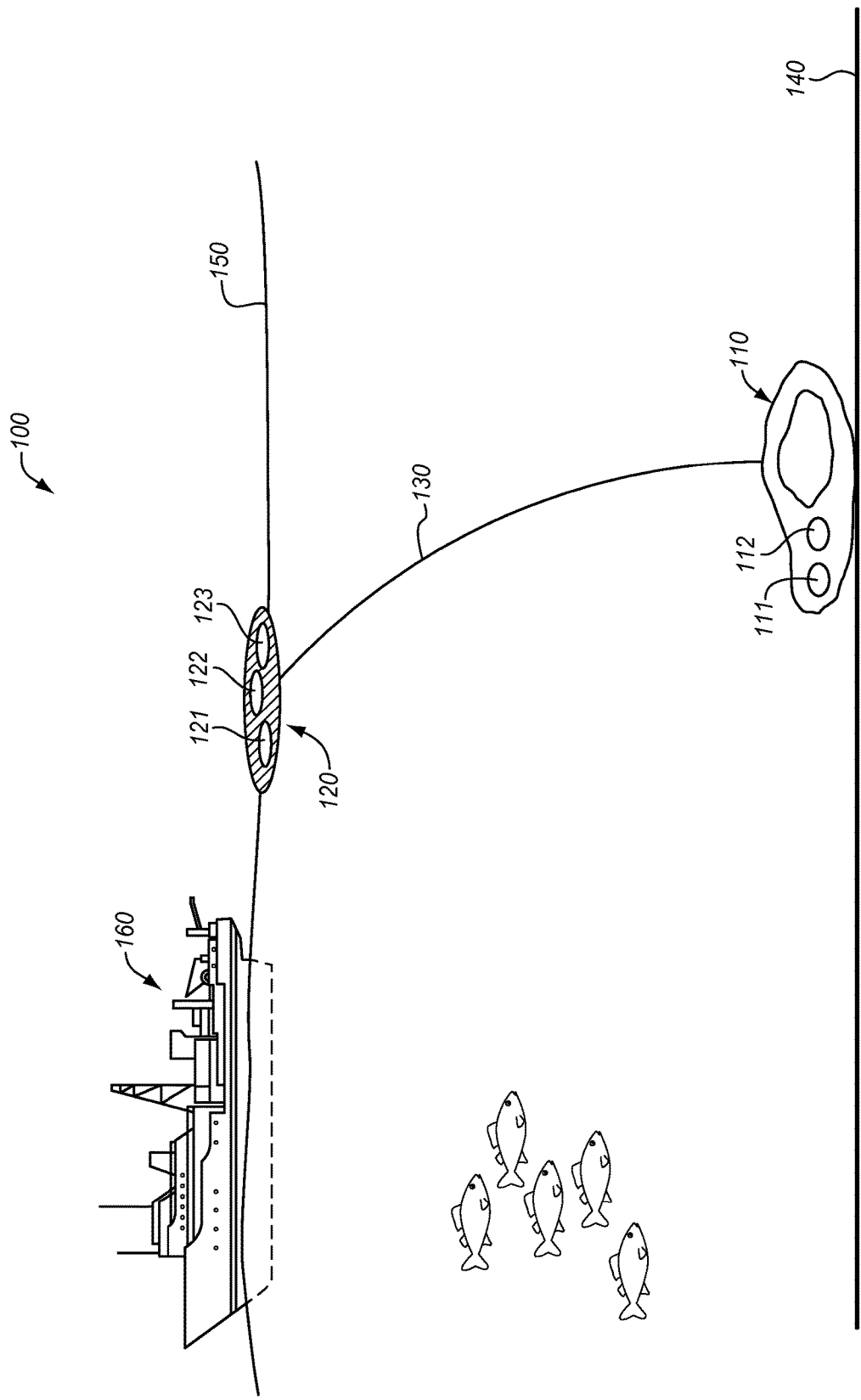
FIG. 1 is an illustration of a surveillance system in an exemplary embodiment.

FIG. 1 is an illustration of a surveillance system 100 in an exemplary embodiment. In this exemplary embodiment, system 100 includes a submerged node 110 resting on a floor 140 of a body of water, a floating module 120 on a surface 150 of the water, and a cable 130 coupling submerged node 110 with floating module 120. Generally, system 100 collects sensor data about the environment for later retrieval by remote assets, and harvests power from the environment for use in performing this activity. For instance, system 100 may monitor and store data on nearby ships or other possible threats that can be recovered at a later time by a remote asset. System 100 may also remain on station for long periods of time using locally harvested energy. Further, floating module 120 may be disguised as debris to render system 100 hard to detect. In like manner, submerged node 110 may include a non-metallic outer shell to reduce the detectability of submerged node 110.

In this exemplary embodiment, floating module 120 includes an antenna 121, a sensor system 122, and a power harvesting system 123. Antenna 121 on floating module 120 allows submerged node 110 to communicate with remote assets, such as satellites, other submerged nodes, ships, aircraft, underwater vehicles, divers, etc., which otherwise would be difficult as water is a poor medium for transmitting radio waves. Antenna 121 includes any component, system, or device that is able to communicate via wireless, such as infrared, radio wave, light, etc. Sensor system 122 is used to collect sensor data, and includes any component, system, or device that is able to detect, measure, or deduce data from the environment. Some examples of sensors that may be part of sensor system 122 include electromagnetic sensors, radiological sensors, acoustical sensors, etc. Power harvesting system 123 generates electricity via energy harvested from the environment for use by system 100. For instance, power harvesting system 123 may utilize the energy captured from waves, solar energy captured from the sun, and/or heat energy from the environment. With regard to heat energy, a temperature differential between the top surface of the floating module 120 and its lower surface that is directly in contact with the water may be used to drive a thermoelectric generator and provide electricity to submerged node 110 to allow system 100 to perform its functions. Generally, power harvesting system 123 includes any component, system, or device that is able to gather energy from the environment.

Submerged node 110 includes a power storage system 111 and a data storage system 112. Power storage system 111 includes any component, system, or device that is able to store energy. One example of power storage system 111 is a battery or super capacitor. Data storage system 112 includes any component, system, or device that is able to store data for later retrieval. Some examples of data storage system 112 are flash memory, Random Access Memory, disk drives, tape drives, optical drives, etc.

Cable 130 couples floating module 120 to submerged node 110 and carries electricity and data between floating module 120 and submerged node 110. For example, floating module 120 generates and provides electricity to submerged node 110 by way of cable 130 for storage at a power storage system 111. In like manner, floating module 120 provides sensor data captured by sensor system 122 to submerged node 110 by way of cable 130 for storage at data storage system 112.

During the operation of system 100, submerged node 110 may receive a query for some or all of the stored sensor data by a remote entity (e.g., an aircraft communicating with submerged node 110 via antenna 121). Generally, it is undesirable for system 100 to continuously broadcast over radio, as this makes detecting system 100 easier. Thus, system 100 may be designed to wait for a query for the stored sensor data prior to beginning transmission of the stored sensor data.

The query may comprise, for instance, a query for data regarding movements of vessels (e.g., vessel 160) in the nearby area. Based on the query, submerged node 110 identifies the relevant sensor data stored by data storage system 112, and transmits a response to the query for the sensor data using antenna 121 located on floating module 120.

System 100 is a unique combination of floating module 120 coupled with submerged node 110 via cable 130, which provides a number of advantages over other surveillance systems. Because floating module 120 includes power harvesting system 123, system 100 can remain on station for long periods of time without requiring refueling or recharging. System 100 may also be rapidly deployed in areas of interest to perform surveillance activities, and then recovered for use in other areas. In previous surveillance systems, fixed placement of systems often limited their use to specific locations around the world, while underwater vehicles had limited on-station time and floating buoys could be easily detected and eliminated. By utilizing a neutral buoyancy cable 130 whose length far exceeds the distance between floor 140 and water surface 150, system 100 can monitor an area that extends beyond the immediate vicinity of the submerged node 110.

Figure 2:
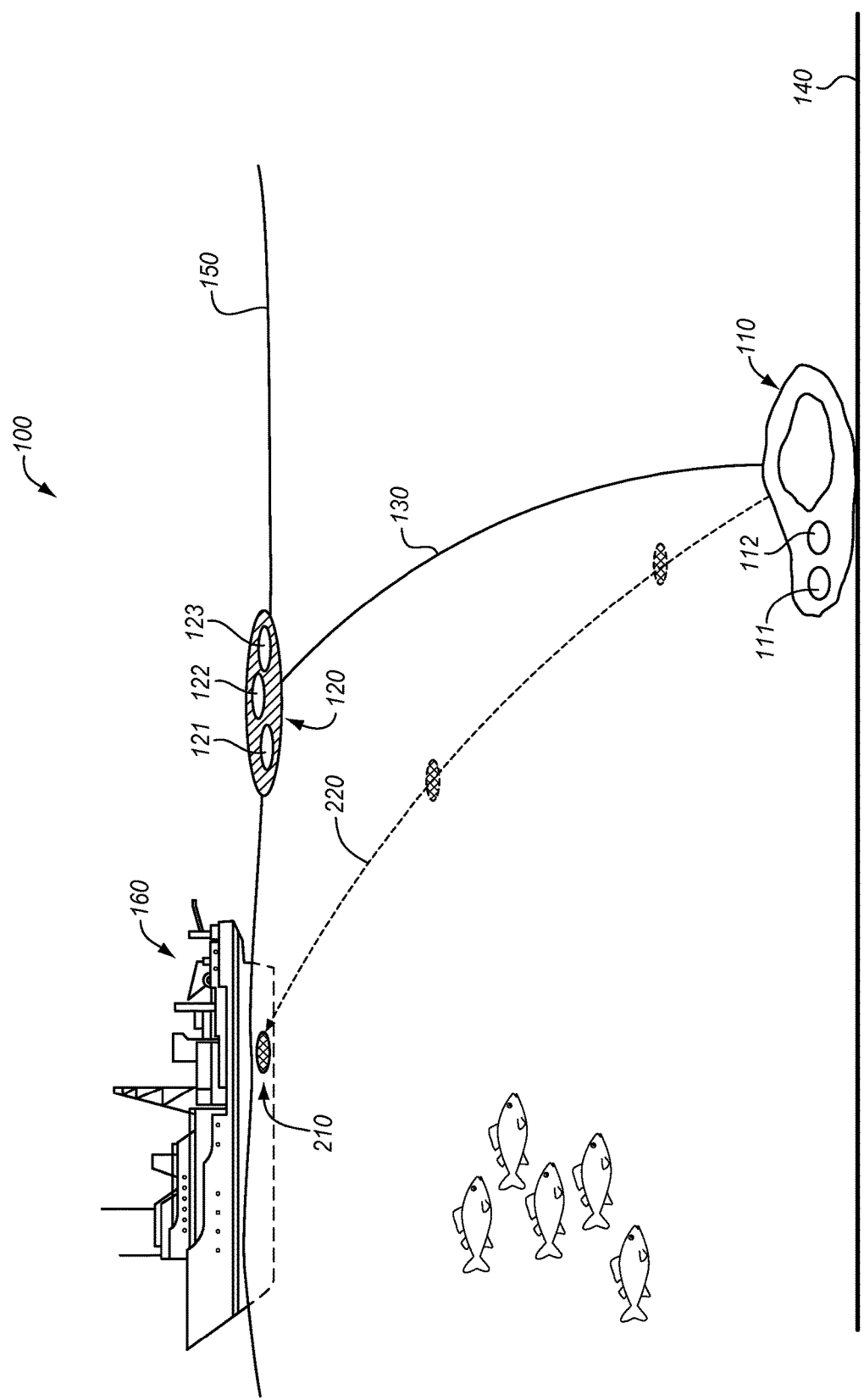
FIG. 2 is an illustration of the surveillance system of FIG. 1 in another exemplary embodiment.

FIG. 2 is a diagram illustrating system 100 in another exemplary embodiment. Consider, for instance, that vessel 160 is detected and is nearby system 100. While system 100 may be able to collect a large amount of information regarding vessel 160 at a distance, it may be desirable to collect information that is generally harder to detect unless closer. For example, voice conversations occurring on vessel 160 are often not easily detectable outside the hull of vessel 160 and/or at a distance from vessel 160.

In this exemplary embodiment, system 100 has been enhanced to attach a probe 210 onto vessel 160 to collect communications occurring on vessel 160. Such communications may include conversations occurring between people on vessel 160, and/or may include short range wireless communications that would not easily be detectible at a distance from vessel 160 (e.g., Bluetooth, Wi-Fi, etc.). Submerged node 110 may launch probe 210 toward vessel 160 and then guide probe 210 to attach to vessel 160 (e.g., magnetically couple to vessel 160). This may allow probe 210 to monitor and relay communications occurring on vessel 160 back to submerged node 110. In some exemplary embodiments, probe 210 is coupled with submerged node 110 using a tether 220. Tether 220 may include some type of lightweight fiber optic cable that allows probe 210 to relay communications back to submerged node 110.

In some exemplary embodiments, submerged node 110 may include a warhead or some other type of explosive device that is able to traverse tether 220 to strike vessel 160. In this exemplary embodiment, a decision may be made to attack vessel 160 in response to the conversations monitored on vessel 160 by probe 210. Assume, for example, that probe 210 is attached to vessel 160 and is monitoring conversations on vessel 160. These conversations are transmitted back along tether 220 for storage by submerged node 110 in data storage system 112. At some point, submerged node 110 receives a query for the conversations from a remote entity, and transmits the conversations to the remote entity for analysis. The analysis may reveal, for instance, that vessel 160 is being used to plan a terrorist attack or may be considered as hostile for all intents and purposes. Submerged node 110 may then receive instructions to fire the warhead along tether 220 and attack vessel 160. Use of tether 220 in this example provides some security that the warhead will in fact strike vessel 160 and not accidentally strike some other nearby ship that is not the target.

Although not illustrated in FIG. 2, probe 210 may detach from submerged node 110 and trail its own type of floating platform along tether 220, which may be disguised as debris in a manner similar to floating module 120. Trailing a floating platform may allow probe 210 to respond to external queries for the monitored communications that may be stored by probe 210, and may allow for probe to receive energy harvested from its own floating platform. For example, probe 210 may monitor communications occurring on vessel 160 over a number of days or weeks, receiving electricity from its trailing platform while receiving periodic queries from a satellite for the communications that have been monitored on vessel 160. This allows system 100 in this exemplary embodiment to covertly monitor conversations and short range communications occurring on vessel 160 over a long period of time.

Figure 3:
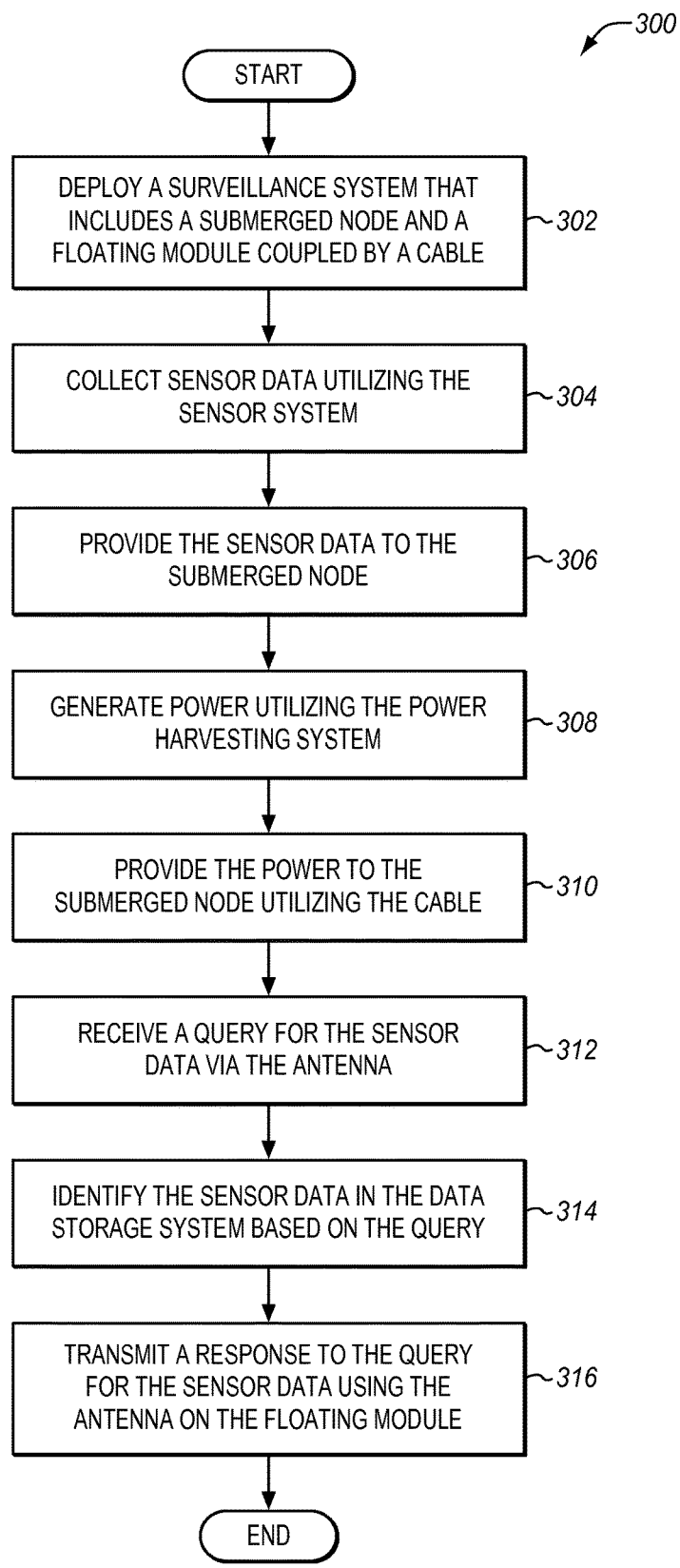
FIG. 3 is a flow chart illustrating a method of operating the surveillance system of FIG. 1 in another exemplary embodiment.

FIG. 3 is a flow chart illustrating a method 300 of operating system 100 of FIG. 1 in another exemplary embodiment. The steps of method 300 are not all inclusive and may include other steps not shown. The steps may also be performed in an alternative order. Consider, for example, that system 100 is to be rapidly deployed for monitoring an area of an ocean or lake.

Step 302 comprises deploying system 100. Deployment may occur via ship, aircraft, etc. During deployment, submerged node 110 sinks towards floor 140. Submerged node 110 may reach floor 140 of the water and then unroll a reel of cable 130 with floating module 120 attached until floating module 120 reaches surface 150 of the water. However, other types of deployments are possible.

After deployment, sensor system 122 on floating module 120 begins collecting sensor data about the surrounding environment (see step 304). For example, sensor system 122 may monitor short range radio communications in the area of interest generated by vessel 160. The sensor data is provided to submerged node 110 over cable 130 for storage by data storage system 112 (see step 306). The floating module also begins harvesting energy from the environment to generate electricity (see step 308). One way to generate electric power is using solar cells. Thus, power harvesting system 123 may use one or more solar cells to generate electricity, and then provide the electricity to submerged node 110 for storage by power storage system 111 via cable 130 (see step 310). Cable 130 may include fiber optic lines for data, insulated wires for data and power, etc., as a matter of design choice. Over time, system 100 collects a variety of information about the environment that system 100 is in. For example, system 100 may collect short range radio broadcasts, voice conversations from passing vessel 160, underwater sonar contacts, etc. At some point, system 100 receives a query for some or all of the stored sensor data from a remote entity, such as a passing vessel, an aircraft, a satellite, etc., via antenna 121 on floating module 120 (see step 312). For instance, an aircraft may overfly the area near system 100 and poll submerged node 110 for sensor data regarding the number of ships and the routes that they took through the area around system 100.

In response to the query for the sensor data, submerged node 110 accesses data storage system 112 and attempts to identify the sensor data that has been requested (see step 314). For instance, the query may request wireless broadcasts that have been detected by system 100 over the last week. After identifying the requested sensor data, submerged node 110 transmits a response to the query to the remote entity using antenna 121 on floating module 120. In order to remain as undetectable as possible, the transmission may be performed using low power or in a directional manner back to the remote entity. This reduces the possibility that system 100 may be detected by a third party during the transmission process.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific exemplary embodiments were described herein, the scope is not limited to those specific exemplary embodiments. Rather, the scope is defined by the following claims and any equivalents thereof.

The invention claimed is:

1. An apparatus comprising:
   a submerged node configured to rest on a floor of a body of water, wherein the submerged node includes a power storage system and a data storage system;
   a floating module configured to float on a surface of the body of water, wherein the floating module includes an antenna, a sensor system, and a power harvesting system;
   a cable configured to couple the submerged node to the floating module;
   a probe; and
   a tether configured to couple the probe to the submerged node;
   the floating module is further configured to collect sensor data utilizing the sensor system, and to provide the sensor data to the submerged node utilizing the cable for storage by the data storage system;
   the floating module is further configured to generate power utilizing the power harvesting system, and to provide the power to the submerged node utilizing the cable for storage by the power storage system;
   the submerged node is further configured to extend the tether to deploy the probe, to attach the probe to a passing vessel, to monitor communications on the passing vessel utilizing the probe, to receive the communications from the probe utilizing the tether, and to store the communications in the data storage system;
   the submerged node is further configured to receive a query for at least one of the sensor data and the communications via the antenna on the floating module, to identify the at least one of the sensor data and the communications in the data storage system based on the query, and to transmit a response to the query for the at least one of the sensor data and the communications utilizing the antenna on the floating module.

2. The apparatus of claim 1 wherein:
the power harvesting system on the floating module is configured to generate the power for the submerged node based on at least one of solar energy, wave energy, and heat energy.

3. The apparatus of claim 1 wherein:
the sensor system on the floating module includes at least one of an electromagnetic sensor, a radiological sensor, and an acoustic sensor.

4. The apparatus of claim 1 wherein:
the submerged node is further configured to launch a warhead along the tether to strike the passing vessel.

5. The apparatus of claim 1 wherein:
the submerged node is further configured to receive the query for the at least one of the sensor data and the communications from another submerged node.

6. The apparatus of claim 1 wherein:
the submerged node is further configured to receive the query for the at least one of the sensor data and the communications from at least one of a satellite, a ship, an aircraft, an underwater vehicle, and a diver.

7. The apparatus of claim 1 wherein:
the body of water is an ocean.

8. The apparatus of claim 1, wherein:
the communications comprise voice conversations that occur on the passing vessel.

9. A method comprising:
deploying a surveillance system that includes a submerged node, a floating module coupled to the submerged node by a cable, and a probe coupled to the submerged node by a tether, wherein the submerged node includes a power storage system and a data storage system, and wherein the floating module includes an antenna, a sensor system, and a power harvesting system;
collecting sensor data utilizing the sensor system;
providing the sensor data to the submerged node utilizing the cable for storage by the data storage system;
generating power utilizing the power harvesting system;
providing the power to the submerged node utilizing the cable for storage by the power storage system;
extending the tether to deploy the probe;
attaching the probe to a passing vessel;
monitoring communications on the passing vessel utilizing the probe;
receiving communications from the probe utilizing the tether;
storing the communications in the data storage system;
receiving a query for at least one of the sensor data and the communications via the antenna on the floating module;
identifying the at least one of the sensor data and the communications in the data storage system based on the query; and
transmitting a response to the query for the at least one of the sensor data and the communications utilizing the antenna on the floating module.

10. The method of claim 9 wherein generating the power further comprises:
generating the power for the submerged node based on at least one of solar energy, wave energy, and heat energy.

11. The method of claim 9 wherein collecting sensor data further comprises:
collecting at least one of electromagnetic data, radiological data, and acoustical data.

12. The method of claim 9 wherein the method further comprises:
launching a warhead along the tether to strike the passing vessel.

13. The method of claim 9 wherein receiving the query further comprises:
receiving the query for the at least one of the sensor data and the communications from another submerged node.

14. The method of claim 9 wherein receiving the query further comprises:
receiving the query for the at least one of the sensor data and the communications from at least one of a satellite, a ship, an aircraft, an underwater vehicle, and a diver.

15. The method of claim 9 wherein the surveillance system is deployed in an ocean.

16. The method of claim 9, wherein:
the communications comprise voice conversations that occur on the passing vessel.

17. An apparatus comprising:
an array configured to float on a surface of an ocean and configured to generate electricity;
a submerged node configured to lie on a floor of the ocean;
a cable configured to couple the array to the submerged node;
a probe; and
a tether configured to couple the probe to the submerged node;
the submerged node further configured to receive the electricity generated by the array, and to store the electricity;
the submerged node is further configured to extend the tether to deploy the probe, to attach the probe to a passing vessel, to monitor communications on the passing vessel utilizing the probe, to receive the communications from the probe utilizing the tether, and to store the communications;
the submerged node further configured to receive sensor data collected by the array, and to store the sensor data.

18. The apparatus of claim 17 wherein:
the submerged node is further configured to receive a query for at least one of the sensor data and the communications via an antenna on the array, and to transmit a response to the query over the cable to the antenna.

19. The apparatus of claim 17, wherein:
the communications comprise voice conversations that occur on the passing vessel.

* * * * *